US007236786B2

(12) United States Patent
Shen et al.

(10) Patent No.: US 7,236,786 B2
(45) Date of Patent: Jun. 26, 2007

(54) METHOD AND SYSTEM FOR PROVIDING FAST HANDOFF IN A WLAN-LIKE COMMUNICATION SYSTEM USING ACTIVE NEIGHBORING SETS

(75) Inventors: Jia-Ching Shen, Hsinchu (TW);
Yih-Shen Chen, Hsinchu (TW);
Chung-Ju Chang, Hsinchu (TW);
Yung-Han Chen, Hsinchu (TW);
Yi-Ting Wang, Hsinchu (TW);
Meng-Chun Chang, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 104 days.

(21) Appl. No.: 10/872,572

(22) Filed: Jun. 22, 2004

(65) Prior Publication Data

US 2005/0282546 A1 Dec. 22, 2005

(51) Int. Cl.
*H04Q 7/20* (2006.01)
*H04Q 7/00* (2006.01)
(52) U.S. Cl. ............... 455/436; 455/438; 455/437; 455/439; 455/440; 455/441; 455/432.1; 455/435.1; 455/435.2; 455/435.3; 370/331; 370/332; 370/333
(58) Field of Classification Search ........ 455/436–439, 455/435.1–435.3, 432.1–432.3, 440, 441; 370/331–333
See application file for complete search history.

(56) References Cited

U.S. PATENT DOCUMENTS 5,509,051 A * 4/1996 Barnett et al. ............. 455/443
5,633,888 A * 5/1997 Stewart .................... 375/132
5,640,676 A * 6/1997 Garncarz et al. .......... 455/436
5,678,184 A * 10/1997 Cutler et al. .............. 455/436
6,393,282 B1 * 5/2002 Iimori ..................... 455/432.1
6,449,246 B1    9/2002 Barton et al.
2004/0137902 A1 * 7/2004 Chaskar et al. ............ 455/436

OTHER PUBLICATIONS

IEEE Computer Society, "IEEE Trial-Use Recommended Practice for Multi-Vendor Access Point Interoperability via an Inter-Access Point Protocol Across Distribution Systems Supporting IEEE 802.11™ Operation," IEEE Standards, Jul. 14, 2003.

* cited by examiner

*Primary Examiner*—Lester Kincaid
*Assistant Examiner*—Emem Ekong
(74) *Attorney, Agent, or Firm*—Finnegan, Henderson, Farabow, Garrett & Dunner, L.L.P.

(57) ABSTRACT

Methods and systems for providing fast handoff in WLAN-like communications system construct a caching candidate set based upon a weighted handoff tendency coefficient. The weighted handoff tendency coefficient is based upon the handoff matrix and the weighting factor. The handoff matrix is an adaptive two-dimensional array that provides a list of nearby access points relative to a mobile station and the weighting factor is a value that prioritizes the nearby access points based upon a signal quality indication. A home access point, once it is triggered to initialize proactive caching, provides the caching candidate set with registration data of the mobile station before a transfer of a connection between the home access point and one of the access points on the caching candidate set.

31 Claims, 9 Drawing Sheets

| | $401_0$ | $401_1$ | $401_2$ | $401_3$ | | $401_N$ |
|---|---|---|---|---|---|---|
| $401_0$ | N/A | N/A | N/A | N/A | • • • | |
| $401_1$ | 0.0 | -0.78 | 1.4 | | • • • | |
| $401_2$ | 15 | 1.7 | -1.98 | | • • • | |
| $401_3$ | 9 | 25 | 9 | | • • • | |
| | • • • | • • • | • • • | • • • | • • • | • • • |
| $401_N$ | | | | | | |

METHOD AND SYSTEM FOR PROVIDING FAST HANDOFF IN A WLAN-LIKE COMMUNICATION SYSTEM USING ACTIVE NEIGHBORING SETS

DESCRIPTION OF THE INVENTION

1. Field of the Invention

This invention generally relates to a method and system for fast handoff in a WLAN-like communication system and, more particularly, to a method and system for fast handoff in a WLAN-like communication system by using an active neighboring set to determine a caching candidate set for mobile service information forwarding.

2. Background of the Invention

Currently, cellular mobile networks may provide wireless connectivity between two mobile terminals spanning over a large geographic area. In addition, wireless Internet connections, using cellular mobile networks, have also increased in use. Cellular mobile networks (e.g., GSM/GPRS), however, lack capability for high-speed data transmission.

In order to provide faster data transmission rates using wireless connections, heterogeneous networks may be used. A heterogeneous network may include one or more large area cellular networks and several small area wireless local area networks (WLAN). In the heterogeneous network, the WLAN works in conjunction with the large area cellular network in order to achieve higher data transmission rates.

WLANs were originally proposed as a wireless extension of the IEEE 802.3 Ethernet. However, in IEEE 802.11 (802.11a, 802.11b, or 802.11g), no standards for handoff functions were proposed. A handoff function occurs when a station moves from a home access point (AP) to a nearby AP. A re-association procedure (handoff) initiates to make a connection with the nearby AP. After the re-association procedure or handoff, the nearby AP becomes a new home AP.

A problem with the handoff function is that an amount of time required for the handoff may be excessive. Reasons for the excessive handoff time include probing, where a station searches for a beacon pilot from the nearby AP, and because of back-end signaling between APs and AAA servers. An AAA server handles connection requests for access to network resources and provides authentication, authorization, and accounting (AAA) services. An AAA server is located in the back-end network and shared by many APs.

One resolution to reduce the back-end signaling time is an Inter-AP protocol (IAPP). A main element of IAPP is proactive caching. Proactive caching occurs when the home AP determines a caching candidate set and distributes home AP registration data to the caching candidate set in advance so that the back end signaling time during handoff is significantly reduced. The members of the caching candidate set include the APs that reside in a neighboring area of the home AP. The IAPP described above is part of IEEE 802.11f.

FIG. 1 illustrates a protocol between a home AP and a target AP under an existing WLAN protocol stack 100. WLAN protocol stack 100 includes a home AP 102, a target AP 104, an IAPP 106, an IAPP 108, AP Management Entities (APME) 110 and 112, MAC Layer Management Entities (MLME) 114,115 (including MLME 115*a*), and 116, a STA 118 (including STA 118*a*), a cache 120, a cache 122, a neighboring graph 124, primitives 126, 128, 130, and 132, an IAPP-Cache.Notify packet 134, an IAPP-Move packet 136, and signals 138, 140, 142, and 144.

Generally, STA 118 may be a mobile station which accesses radio resources from a home AP and moves within the service area of the home AP. MLMEs 114, 115, and 116 may reside in an AP. MLMEs 114, 115, and 116 may handle MAC layer functions such as the transmission of a beacon frame, the transmission/reception of control frames, and an indication of association/re-association of STA 118 to a higher layer.

IAPPs 106 and 108 communicate with APMEs 110 and 112, respectively. IAPP 106 communicates with APME 110 by primitives 126 and 128. IAPP 108 communicates with APME 112 by primitives 130 and 132. Primitives 126, 128, 130, and 132 are defined in the IEEE 802.11.

STA 118 registers to APs by sending signals, e.g., signals 142 and 144, to either home AP 102 or target AP 104, through MLME 114 or MLME 116, respectively. MLME 114 communicates with APME 110 by sending signal 138. MLME 116 communicates with APME 112 through signal 140.

Generally, when STA 118 leaves a service area associated with home AP 102 and hands off toward a service area of a nearby AP (e.g., target AP 104), STA 118 may send an association or re-association service primitive to target AP 104, by means of signal 144. After the association or re-association is complete, target AP 104 becomes a new home AP for the station.

Specifically, in WLAN protocol stack 100, a mobile station (e.g., STA 118) establishes a connection with the home AP 102 for communications with a second mobile station (not shown). When STA 118 leaves a service area associated with home AP 102 (e.g., as shown by a dashed arrow pointing right), STA 118 (represented in FIG. 1 as STA 118*a*) attempts to associate with target AP 104, and target AP 104 will authenticate this STA 118 and then communicate with home AP 102 to release its connection with STA 118.

To facilitate a transfer between home AP 102 and target AP 104, home AP 102 may also receive an association or re-association primitive from STA 118, through signal 142. At such time, home AP 102 searches a cache candidate set where information of neighboring graph 124 is contained. In the cache candidate set, home AP 102 determines which APs reside at a nearby area and determines a caching candidate list that may include all nearby APs. The caching candidate list may include target AP 104.

The neighboring graph 124 of each AP is a collection of information of all nearby APs into which or from which STAs may handoff.

Via primitives 126 and 128 communicating between APME 110 and IAPP 106, home AP 102 sends an IAPP-Cache.Notify packet 134 to every AP which is a member of the caching candidate list. IAPP-Cache.Notify packet 134 carries a registration profile of STA 118. The registration profile is necessary for an authentication or a registration procedure.

Target AP 104 is now notified that STA 118 may roam toward a service area of target AP 104. Once STA 118 moves to the service area of target AP 104, target AP 104 becomes the new home AP and will be able to associate with STA 118. In other words, information relating to STA 118 has passed to target AP 104 in advance in order to reduce a processing time of a back-end authentication signaling procedure.

After the new home AP (target AP 104) is connected with STA 118, target AP 104 may send an IAPP-Move.Notify packet 136 to home AP 102 (now an old home AP) notifying original home AP 102 of an initiation of the handoff. In receiving packet 136, home AP 102 will forward the remaining data relating to STA 118 and then remove them from a memory pool of home AP 102. Once STA 118 moves to another service area, the new home AP (target AP 104) will search cache pool 122 to find nearby APs and pass registration data regarding STA 118 in advance to other possible target APs.

In protocol stack 100, with proactive caching, the registration profile of STA 118 is transferred to target AP 104 before handoff between home AP 102 and target AP 104 is actually initiated. However, there are drawbacks in the IAPP described above.

One drawback is signal flooding. Based on the IAPP, the caching candidate list of the home AP contains all the APs that ever performed the handoff function with the home AP. In other words, when a mobile station originally joins the home AP's service group, the home AP will distribute the IAPP-Cache-Notify packet to all the nearby APs belonging to the neighboring graph. However, the mobile station may actually travel in a unique way and only travel to one of the nearby APs. The unnecessary IAPP-Cache.Notify packet forwarding to all the other APs causes the phenomenon of signal flooding.

Another drawback is the perception of the neighboring graph. As noted above, the home AP forwards the IAPP-Cache.Notify packet to all the nearby APs belonging to the neighboring graph, but the "neighboring graph" viewed from the home AP is different from that viewed from the mobile station. According to a learning mechanism of the IAPP, the neighboring graph is determined from a historical record of the IAPP-Move packets. In other words, the home AP determines a network topology through numerous association/re-association procedures from multiple mobile stations. However, since each mobile station moves with its own unique direction and speed, the network topology from the perspective of the mobile station's perception may be different from the topology determined by the home AP. Moreover, the mobile station may move to an AP that is not included in the caching candidate list; the mobile station may also move to an AP that is included in the caching candidate list but is not recognized by the mobile station.

Generally, under the existing IEEE 802.11f standard, handoff latency is usually located in back-end network signaling. If handoff signaling is performed in advance there may be a reduction in signaling overhead that will result in improving the performance of handoff latency (especially in the latency to establish a radio link), a packet forwarding loss, and also a handoff failure rate.

Proactive caching in IEEE 802.11f is based on a concept to cache a handoff mobile profile in advance to save handoff time spent for the back-end network signaling between a currently serving access point (sAP), a targeting access point (tAP), and an AAA server. However, in the IAPP approach noted above, proactive caching candidates should be carefully selected to reduce signal flooding overhead and packet forwarding overhead.

SUMMARY OF THE INVENTION

In accordance with the invention, there provided a method for providing proactive caching. The method includes constructing a handoff matrix, including a plurality of access points in an active neighboring set. The method also includes receiving reports of signal quality or other mobile specific information for the active neighboring set during the transmission, adjusting weighting factors for the active neighboring set according to the received reports, and determining a caching candidate set, having the active neighboring set, according to a weighted handoff tendency coefficient, and sending registration data of the mobile station to the caching candidate set when the communication signal received at the mobile station is below a predetermined threshold level. The weighted handoff tendency coefficient is based upon the handoff matrix and the weighting factor.

In accordance with the present invention, there is also provided a system for providing proactive caching. The system includes a home access point that receives measurement reports and constructs a caching candidate set based upon the measurement reports and a handoff matrix. The system also includes a plurality of a nearby access points included in the caching candidate set. The caching candidates set is determined using a weighted handoff tendency coefficient;

Additional features and advantages of the invention will be set forth in part in the description which follows, and in part will be obvious from the description, or may be learned by practice of the invention. The features and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments of the invention and together with the description, serve to explain the principles of the invention.

In the drawings.

DESCRIPTION OF THE EMBODIMENTS

Reference will now be made in detail to preferred embodiments of the invention, examples of which are illustrated in the accompanying drawings. Wherever possible, the same reference numbers will be used throughout the drawings to refer to the same or like parts.

Figure 2:
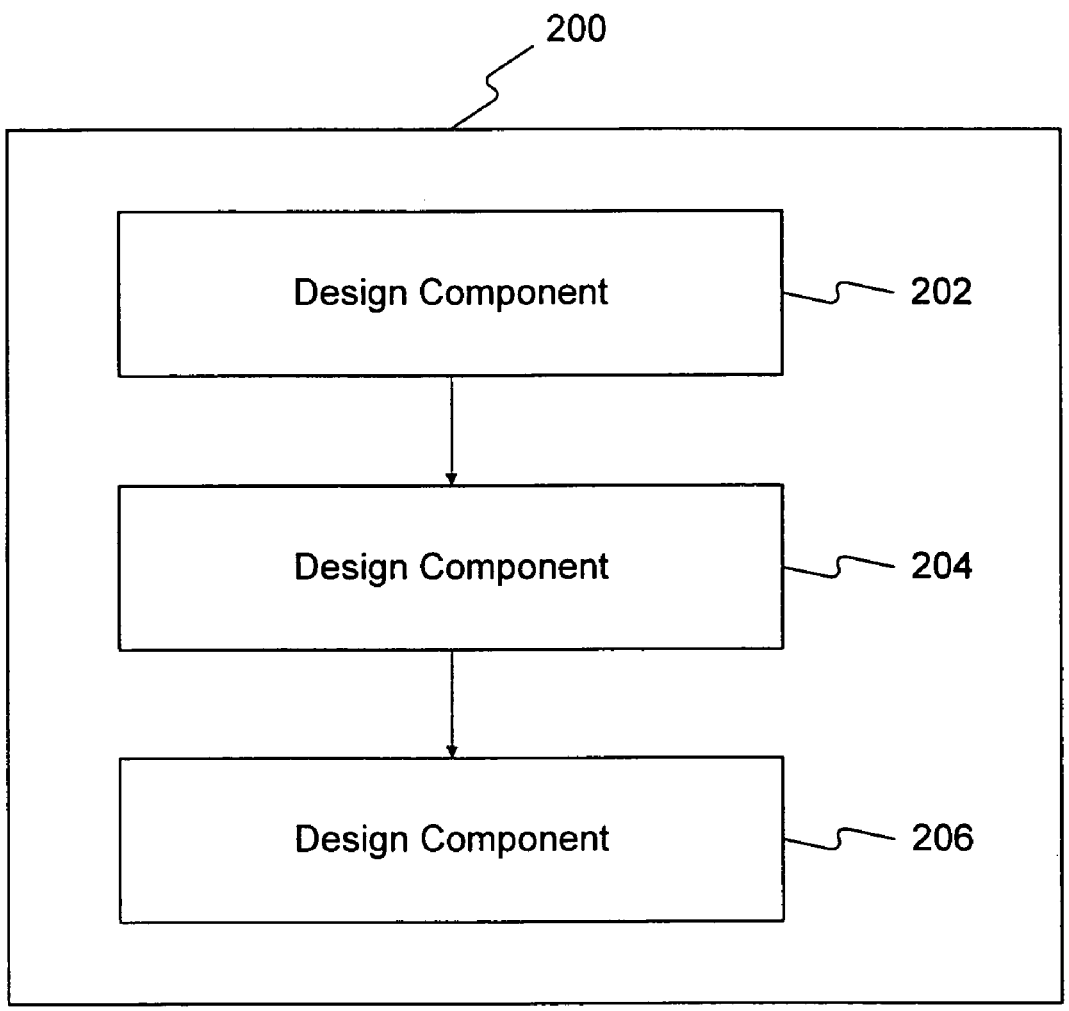
FIG. 2 illustrates three design components of an embodiment to provide handoff in a heterogeneous environment.

FIG. 2 illustrates a design overview 200 using a fast handoff algorithm for wireless networks which may have a small coverage area for each access point and wherein the dwelling time for each moving mobile may be relatively short compared with cellular networks. Design overview 200 includes design components 202, 204, and 206.

Design overview 200 firstly considers design component 202, in which a system model and the considered environment are determined. Design component 202 may include a mobile entering an environment containing multiple operators and many types of coverage areas. The mobile may measure aspects of the environment, such as a strength of communications signals received by one or more APs to determine characteristics of the environment.

Design overview 200 then considers design component 204, in which key elements are found to determine a caching candidate set. Elements involved in determining the caching candidate set include a handoff matrix and an active neighboring set. The handoff matrix is an adaptive matrix that lists priority or tendency values for each AP in relation to other APs. In other words, the handoff matrix generates a probability list that a mobile station will enter a particular target AP 104 from a particular home AP.

The active neighboring set generally includes information for nearby APs, such as the identification of a specific AP, a received signal strength value (e.g., RSSI), and also other mobile-specific information to properly weight the priority values contained within the handoff matrix.

At design component 206, a fast handoff procedure is applied. Generally, the preparation of the fast handoff procedure includes proactive caching and packet forwarding in order to speed the handoff process.

FIGS. 3–9, explain in more detail the concepts underlying the design components of design overview 200.

Figure 3:
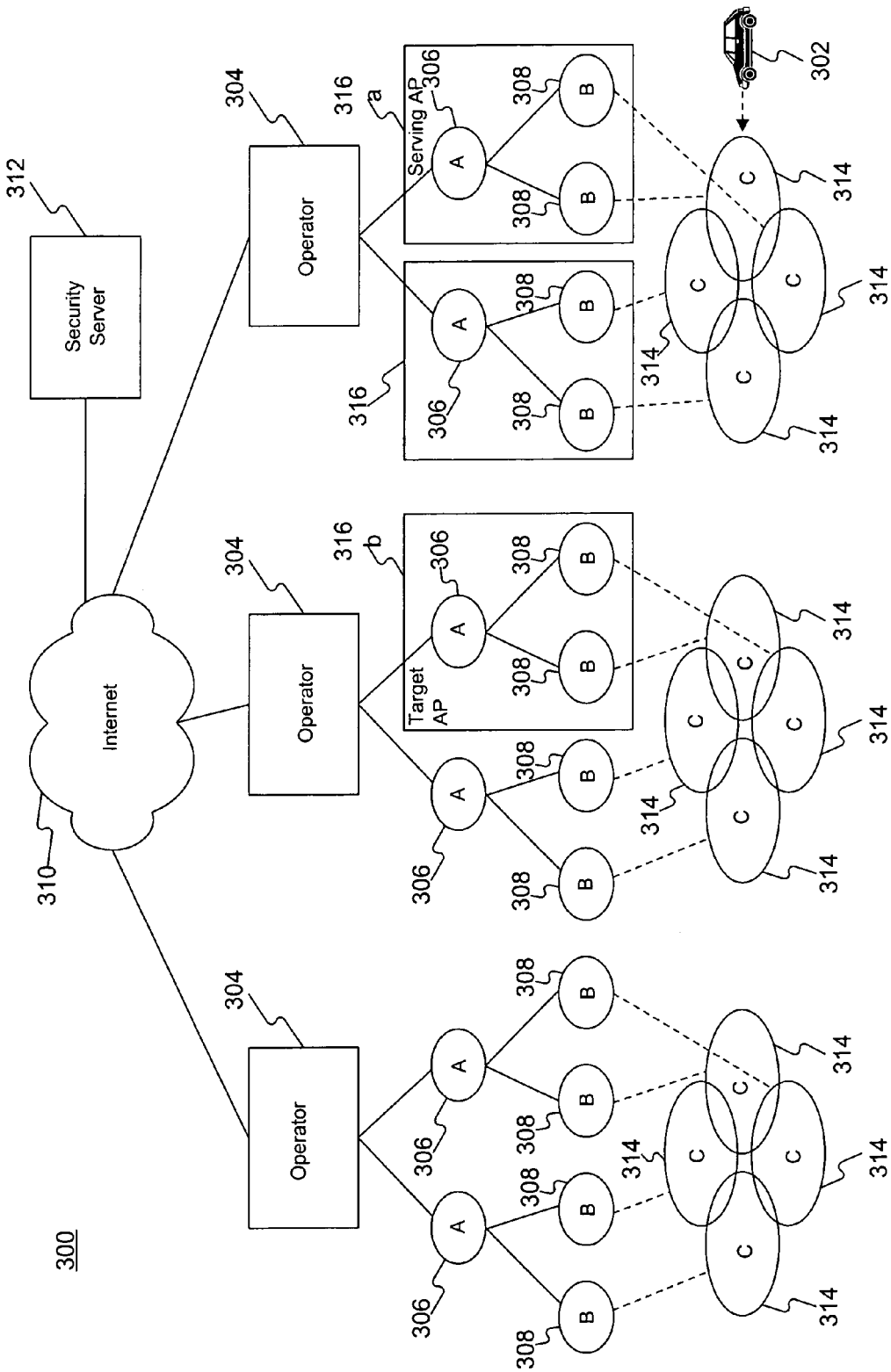
FIG. 3 illustrates a system consistent with the present invention.

FIG. 3 illustrates a system 300 for determining the system model and considered environment. System 300 includes a mobile station 302, operators 304, switching nodes 306, service access nodes 308, a public domain Internet 310, a security server 312, coverage areas 314, and APs 316, including serving AP 316a (sAP) and target APs 316b (tAP)

In FIG. 3, mobile 302 moves into a service area (as indicated by a dashed arrow pointing to the left) where one or more operators 304 deploy a network infrastructure having wireless and a wired-line access interface. For the wireless access interface, service access nodes 308 are deployed for connection with mobile 302. For the wired-line network interface, switching nodes 306 (e.g., a router or an equivalent layer 3 or layer 4 switch), public domain Internet 310, and security server 312 (e.g., an AAA server) are installed for information exchange and to provide security functions.

Each AP 316 may not be pre-arranged in system 300 and may reside at random locations, either among other APs 316 within a domain of the same operator 304 or with APs 316 within a domain of different operators 304. Each AP 316, through service access nodes 308, forms coverage areas 314, where mobile station 302 has availability communications.

Because APs 316 may be randomly distributed, system 300 may have three possible inter-AP coverage relationships. For example, if there is a high density of coverage areas 314 forming many intersecting coverage areas 314, this is a highly overlapping coverage area. If there is a low density of coverage areas 314, there is a lightly overlapping coverage area. If no coverage areas 314 exist, this is called a non-overlapping coverage area.

Overlapping of service coverage for APs 316 may be required for seamless handoff. However, overlapping will deteriorate an efficiency of system 300 due to collision and hidden node problems. The non-overlapping coverage area may result in transmission suspension, long handoff latency, packet forwarding loss, and a buffer overflow. Also, since multiple-operators 304 are possible in system 300, network topologies may be complicated. Therefore, a sophisticated network topology learning scheme may be desirable for a robust handoff procedure.

For a back-end network, one or more APs 316 may be inter-connected to other APs 316. Even in the multiple-operator condition, APs 316 may reach other APs 316 where inter-operability is available. For higher layer functionality of each AP 316, each AP 316 performs an AAA function to certify mobile 302 via security server 312. The signaling between APs 316 follows the IAPP protocol described above.

For example, sAP 316a may currently serve mobile station 302 and a handoff to tAP 316b is desired. Based on an environment of system 300, if a connection is established with sAP 316 and mobile 302 is idle, handoff is not urgent in low latency. Since the handoff procedure may take place during transmission, mobile 302 may continuously measure a received signal strength indication (RSSI) of sAP 316a and respond to a measurement report of sAP 316a in an uplink within system 300. Mobile 302 may also measure, although less frequently, the RSSI from other APs (e.g., tAP 316b) located in the neighborhood. Mobile 302 may also measure the RSSI when the measurement is not available. Therefore, a pre-knowledge of a candidate set of APs 316 may be acquired for each mobile 302.

For the handoff procedure, a mobile controlled handoff may adapt to an architecture of the WLAN-based network, for example system 300. Other pre-handoff work, such as proactive caching and packet forwarding, are executed from sAP 316a in terms of the measurement report received from mobile 302.

Referring again to FIG. 2, after the system model and considered environment are determined at design component 202, the elements to determine a caching candidate are determined at design component 204.

Generally, the weighted handoff tendency coefficient is used to determine the members of the caching candidate set. The weighted handoff tendency coefficient $wHTC_{i,j}$ is defined as $wHTC_{i,j}=P_j*W_{i,j}$, where $P_j$ is an element in a handoff matrix (described below) and $W_{i,j}$ is a weighting factor. $P_j$ is used to indicate the relationship between home AP (oAP) and j-th AP (tAP) residing in the neighboring area (in the following descriptions, $P_j$ and P(oAP,tAP) have equivalent meanings). $W_{i,j}$ is used to indicate the signal strength of the pilot beacon that is sent from the j-th AP and received by the i-th station (in the following descriptions, $W_{i,j}$ and W(tAP) have equivalent meanings). Also, $W_{i,j}$ can be gradually adjusted according to the report, e.g., signal quality or other mobile-specific information, such as velocity and moving direction.

Also, the caching candidate set is determined by sorting the weighted handoff tendency coefficient $wHTC_{i,j}$ and choosing the first p members with largest coefficient values. Here, the number p represents the capacity of the caching candidate set. It is noted that the number of the caching candidate set is not restricted in the description herein. However, properly choosing the number can effectively reduce signal flooding.

Design component 204 mainly focuses on issues about network topology discovery and determination of a handoff candidate set (caching candidate set). Algorithms to discover neighboring APs have been described above. However, in accordance with those algorithms, mobile-specific information other than a received beacon (pilot) strength, velocity, moving direction, and location dependent knowledge may not be used to facilitate a prediction of the target AP for the mobile.

In order to more precisely predict handoff candidates to reduce the signaling overhead, a method and system consistent with the present invention may use a general and extensible handoff candidate set determination scheme (caching candidate set) which fully exploits mobile specific information.

Elements involved in determining the caching candidate set include a handoff matrix and an active neighboring set. Generally, the handoff matrix is stored at the home AP, which is constructed according to a chronicle of handoff records. In other words, a past history of target APs used by mobile stations is stored at the home AP.

The handoff matrix is a two-dimensional array which stores not only the APs residing in the neighboring area but also a relationship among those neighboring APs. The relationship between a pair of APs indicates a likelihood that the moving mobile station coming from one AP will move towards another AP. Each AP maintains its own handoff matrix so that the AP may recognize the localized network topology.

The handoff matrix is adaptive and has dimensions of (N+1)-by-(N+1) where there are N neighboring APs discovered by the home AP. The handoff matrix may have an extra column and row representing the relationship between this specified AP and every nearby AP. Each entry of the handoff matrix stores a quantity of tendency, which is represented by a priority value. The priority value indicates a probability that the mobile station comes from a particular AP and travels towards another particular AP. The adaptation of the handoff matrix follows a learning algorithm and an aging algorithm to collect knowledge indicating current network topology and the possibility of a moving direction of the mobile.

Figures 4A, 4B:
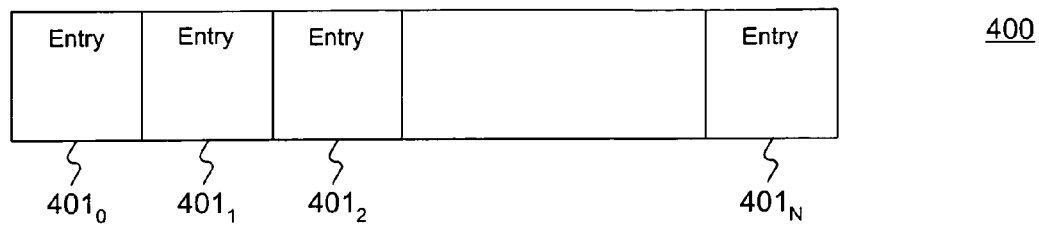
FIGS. 4a and 4b illustrate an index list and a handoff matrix consistent with the present invention.

FIG. 4a illustrates an index list 400. Index list 400 includes entries $401_0$, $401_1$, $401_2$ through $401_N$, where N represents an index number associated with a specific AP (including the home AP and nearby APs). Each entry 401 of index list 400 contains a MAC address or an IP address of the associated AP.

The entry indexed by zero (0) within index list 400 refers to the home AP. Index list 400 may be implemented by a double link list to make pruning and growth of index list 400 easier.

As N number of nearby APs are recognized and indexed on index list 400, a (N+1)-by-(N+1) matrix 402 is formed. FIG. 4b illustrates handoff matrix 402. Handoff matrix 402 includes columns of old APs from which handoff originates and are numbered $401_0$ through $401_N$ corresponding to the indexed APs of FIG. 4a. The rows of matrix 402 include target APs numbered $401_0$ through $401_N$ corresponding to the indexed APs of index list 400. Matrix 402 has entries for each of the columns and rows of indexed APs.

The first column (or first row) represents the index number "0" and represents the serving AP. Therefore, the first column ($401_0$) indicates the mobile station originated from the serving AP and is not a handoff mobile. The row number refers to an expected target AP into which a mobile may move. Each entry for matrix 402 is a priority value indicating a likelihood that a particular mobile from a particular AP will move into such AP.

For example, the priority value for a mobile moving from the AP indexed as $401_0$ to the AP indexed as $401_2$ is 15. Note, since only handoff mobiles may be considered, the first row will be N/A.

Figure 5:
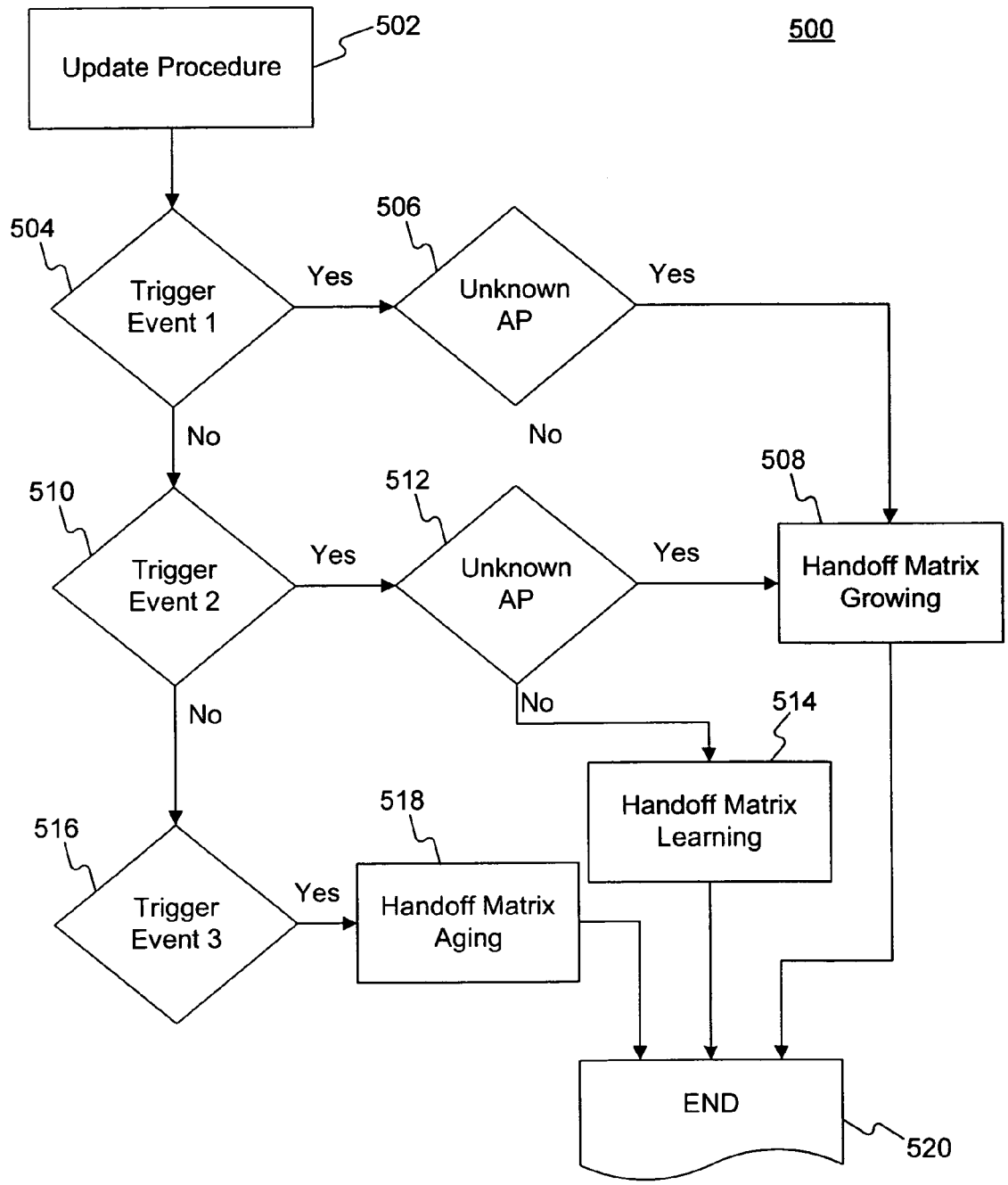
FIG. 5 illustrates a flowchart method for updating a handoff matrix.

The updating method of the handoff matrix controls growth of the matrix, learning of the matrix, and aging (pruning in the future) of the matrix. FIG. 5 illustrates a flowchart of the updating method.

Method 500 begins at a stage 502 where an update procedure is commenced. Generally, each time a trigger event occurs, the handoff matrix will update the priority of each element or enlarge the matrix dimension.

At stage 504 a first trigger event is checked. The first trigger event is successful when, during handoff, a mobile originates from an AP with an unknown IP address or an unknown MAC address. The first trigger event is triggered by a reception of a handoff request with an old serving AP. The IP address identification is compared to recorded IP addresses in the index list. If there are no matches between the IP address identification and the recorded IP addresses, handoff matrix growth is launched at stage 508. If the first trigger does not occur (i.e., when the IP address is known), algorithm 500 proceed to a second triggering event at stage 510.

Figure 1:
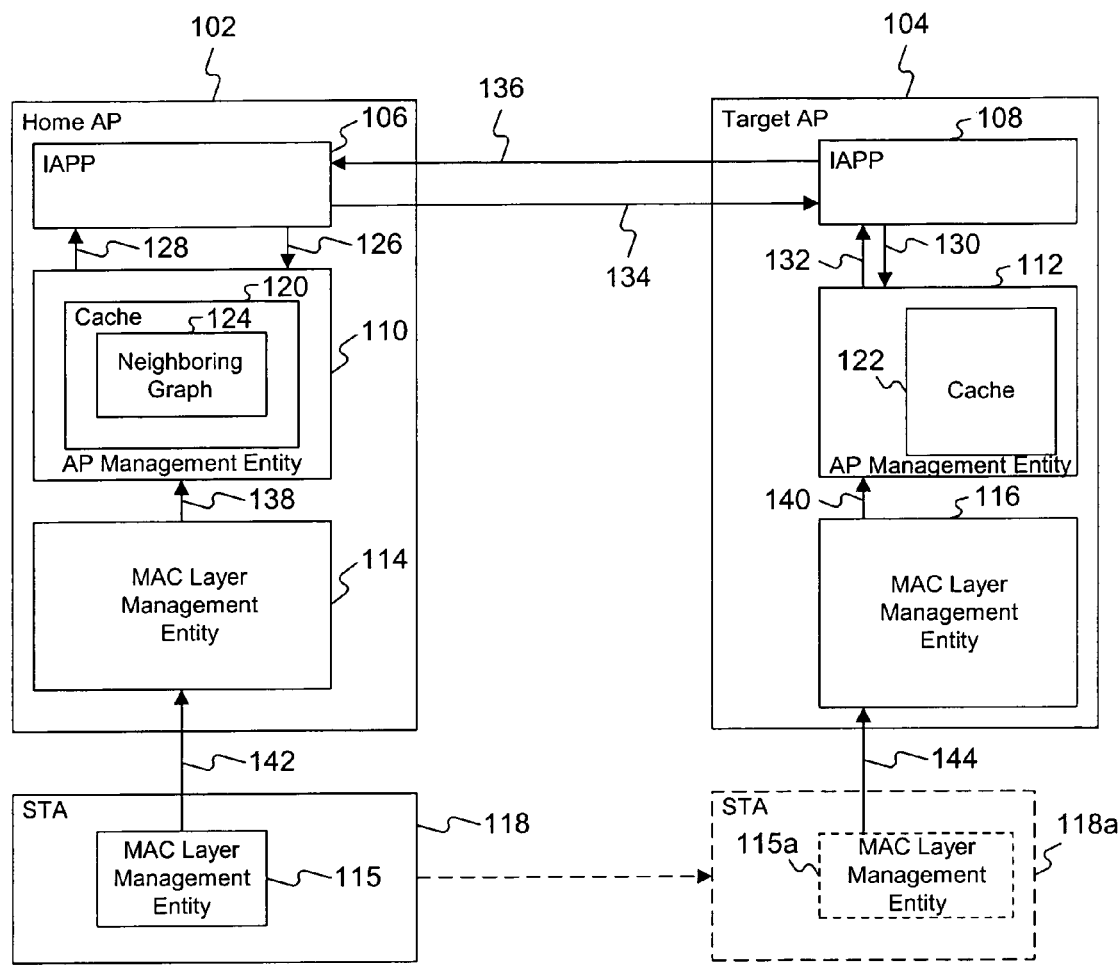
FIG. 1 illustrates an WLAN protocol stack.

At stage 510, the second trigger event occurs when, during handoff, the mobile moves towards a target AP with unknown IP address or unknown MAC address. For example, when the mobile is moving out of the service area of the serving AP, the mobile will send the handoff request to the target AP. The target AP will setup a secure channel with the old serving AP, request remaining packets to be forwarded, and disconnect the original connection between the mobile and the old serving AP. This is done through procedures involving the IAPP_Move.Notify packet defined in the IAPP protocol (IEEE 802.11f) and described above regarding FIG. 1. Upon receipt of the notification of the handoff, the IP address of the target AP is checked against the index list. A handoff matrix growing block will be entered if the IP address is not matched with any IP addresses on the index list at stage 508. If the IP address does match against one of the recorded IP addresses, then method 500 goes to handoff matrix learning at stage 514.

If there is no second triggering event, method 500 proceeds to stage 516. At stage 516, if a third trigger event is successful (an aging period timeout), method 500 proceeds to the aging algorithm at stage 518. The aging algorithm is designed to adapt the knowledge of the AP to the current network topology and the statistics of the handoff events. An aging counter is set to be $T_{aging}$, and as long as the timer times out, the third triggering event leads to the handoff matrix aging algorithm.

If method 500 goes to stages 508, 514, or 518 (i.e., the handoff matrix growing stage, the handoff matrix learning stage, or the handoff matrix aging stage), after the particular stage is completed, method 500 is complete at stage 520.

More particularly, in the handoff matrix growing algorithm of stage 508, the index list (e.g., index list 400 of FIG. 4a) is added with the new AP with the new AP's IP or MAC address recorded. Thus, the length of the index list is now (N+2) and the handoff matrix is expanded to (N+2)-by-(N+2) dimension. The entry (0, N+1) is set to be N/A, and the other (2N) newly created entries of the matrix are initially assigned as 0. One of these (2N) will be the matched entry to which a mobile is handed over, and is assigned by initial priority value $P_{init}$. $P_{init}$ will be averaged out in a long term sense and will affect the convergence of the priority value, especially in the case without dominated priority values.

More particularly, the handoff matrix handoff learning algorithm of stage 514 is triggered by the second triggering event of stage 512 when the IP address of the target AP is found on the index list. In this case, the matched entry should be increased by $P_{inc}$. $P_{inc}$ might be designed together with the aging algorithm and according to the handoff rate in this service area. When the handoff rate is large, the $P_{inc}$ can be designed to be small. Otherwise, a small incremental step will make the priority value meaningless through a few aging periods.

More particularly with regard to handoff matrix aging of stage 518, each entry of the handoff matrix will decrease by 1. A negative priority value indicates the corresponding handoff relationship between the old serving AP and the target AP pair does not exist. This aging period should be properly designed to make the handoff matrix stable and convergent to reflect the handoff relationship among the local serving area.

In addition to the handoff matrix, another element in the handoff candidate set determination scheme (cache candidate set) is the active neighboring set. Compared to the handoff matrix indicating long term statistics of the network topology and the handoff relationship among nearby APs, the active neighboring set is defined for each active mobile to indicate the potential target APs near the mobile.

For example, in FIG. 3, since handoff in system 300 is controlled by mobile 302, target AP 316b usually belongs to the active neighboring set, because the information is useful for sAP 316a to proactively cache the profile of mobile 302.

Figure 6:
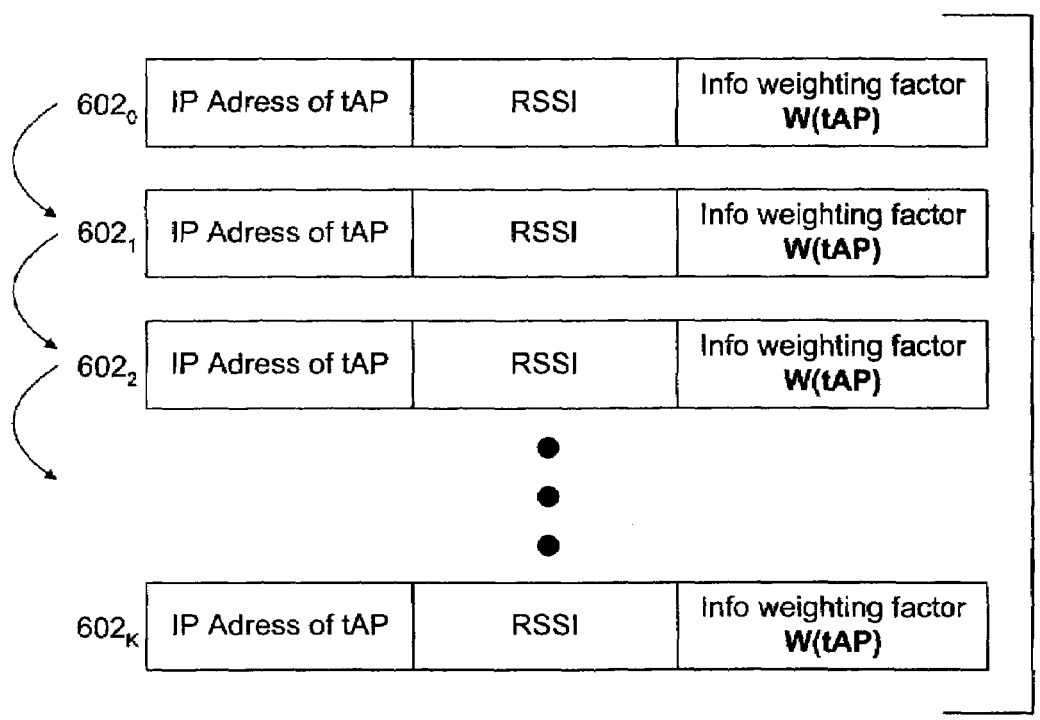
FIG. 6 illustrates a data structure for an active neighboring set.

The structure of an active neighboring set 600 is illustrated in FIG. 6. Active neighbor set 600 is stored at the AP side for each active mobile. Active neighbor set 600 includes information for nearby APs, indicated by nodes $602_0$ through $602_K$ where K indicates the number of detectable APs by the mobile station 302 other than the serving AP. Nodes 602 have fields that contain information, such as the identification of the specific AP, the received RSSI value, and other mobile-specific information to weight the priorities of the handoff matrix where an information weighting factor may give more precise prediction of the moving direction of the mobile.

Active neighbor set 600 may be a link list data structure including several nodes 602 that refer to nearby APs from which the mobile can receive or probe a signal and measure the nearby AP's RSSI values. Node $602_0$ represents the currently serving AP, and the remaining nodes $602_1$ through $602_N$ are the nearby APs.

When a connection between a mobile station and an AP is established, the mobile reports information that may contain measurement results scanned from all nearby APs before connection was setup. During transmission, the mobile continuously measures and reports the signal strength of the serving AP, and occasionally measures and reports the signals from adjacent APs; if possible. As one node 602 is created, the information weighting factor is proportional to the RSSI value such that the stronger the signal is, the higher the probability that the mobile will move to the AP if handoff immediately takes place.

Upon reception of the measurement report of the sAP and other APs, the sAP updates the information weighting function according to the following procedure. If the reported RSSI value of the tAP is increased compared to an existing value, then an information weighting factor (W(tAP)) is increased by $\Delta w$. On the other hand, if the reported RSSI is decreased, the weighting factor is decreased by $\Delta w$.

Moreover, the measurement report of the active neighbor set is not always available for every mobile during the transmission period. In order to avoid outdated information affecting a decision of candidates to be cached, the aging mechanism adapts the information weighting function to the current condition received by the mobile. Each time the aging counter is zero, the weighting factors of the active neighbor set will be decreased by $w_{age}$, until the weighting factor is zero. Note that if further information can be acquired, such as location information or moving direction, the information weighting function may be modified to facilitate the prediction of the target AP.

Referring again to FIG. 2, after the key elements to determine the caching candidate set, design component 206 applies a fast handoff procedure so that a WLAN-like system, such as system 300 of FIG. 3, may be more efficient in handing over a mobile between the home AP and a target AP.

Figure 7:
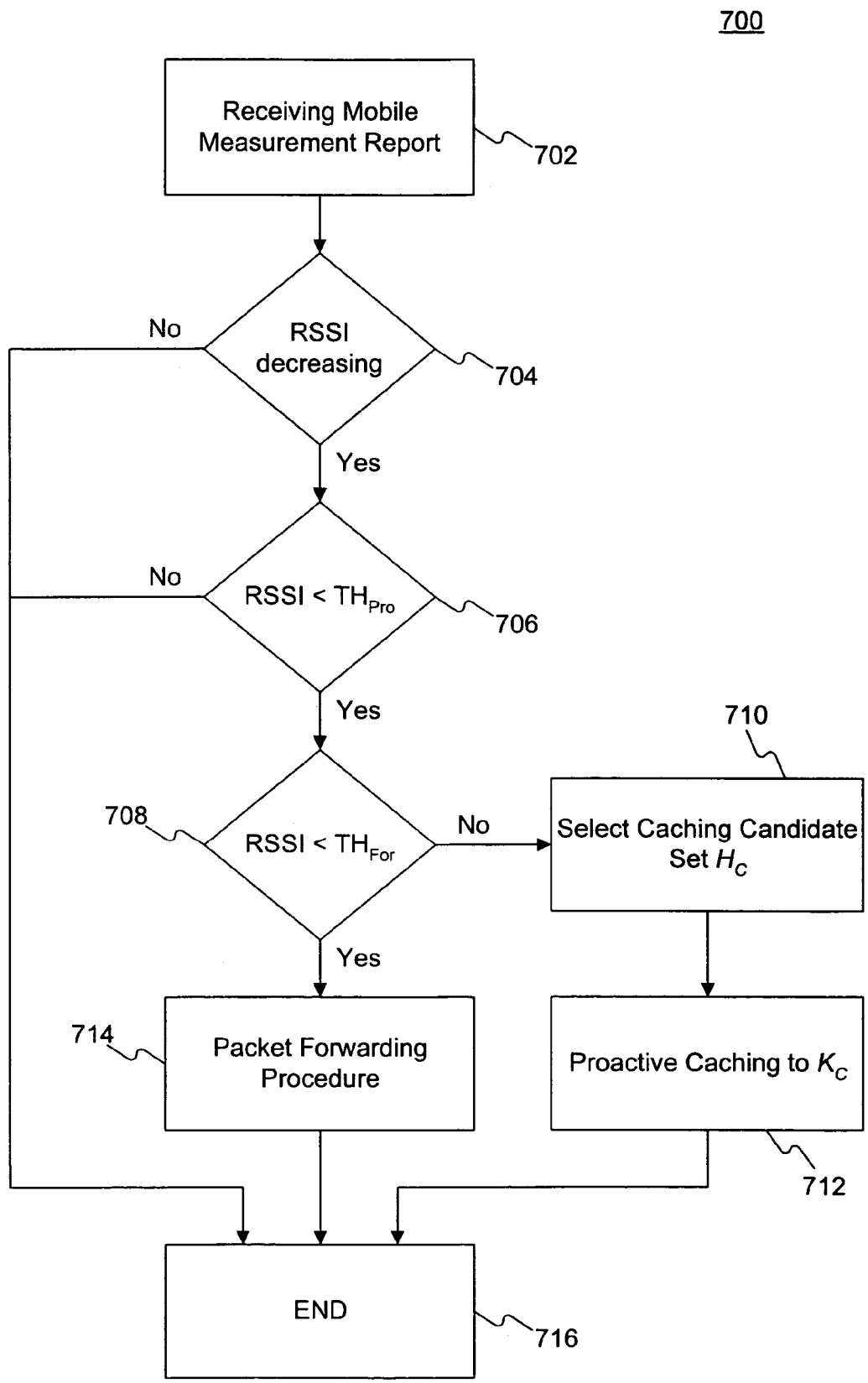
FIG. 7 illustrates a flowchart of a method for determining commencement of proactive caching and a packet forwarding procedure.

FIG. 7 is a flowchart for a method 700 for the preparation of the fast handoff procedure from the perspective of the AP. The preparation of the fast handoff procedure includes proactive caching and packet forwarding in order to speed the handoff process.

The mobile side takes the handoff action, which may be the registration to the target AP without the release of the connection with the old serving AP. As the new target AP receives the handoff request from the mobile, the target AP will take over the handoff procedure, establish a radio link, perform packet forwarding from old serving AP, and request the old AP to release the connection.

At stage 702, an sAP receives a measurement report indicating the RSSI values of all nearby APs including the serving AP.

At stage 704, if the mobile does not report decreasing RSSI values from the sAP, the connection to the sAP is continued and method 700 is directed to end stage 716. If the mobile reports decreasing RSSI values from the serving AP, method 700 goes to stage 706.

At stage 706, the RSSI value is compared to a first handoff threshold value, which is for proactive caching ($Th_{Pro}$). If the RSSI value is less than $Th_{Pro}$, method 700 continues to stage 708. If RSSI is not less than $Th_{Pro}$, method 700 goes to end stage 716.

At stage 708, the RSSI value is compared to a second handoff threshold value, which is for packet forwarding ($Th_{For}$). If the RSSI value is less than $Th_{For}$, method 700 continues to stage 714, which is a packet forwarding procedure which initializes the transfer from the sAP to a tAP. If the RSSI value is not less than $Th_{For}$, method 700 continues to stage 710, where method 700 selects a caching candidate set.

The purpose of stages 704 and 706 is so that the RSSI value is compared with a first and second handoff threshold, which are proactive caching threshold $Th_{Pro}$ and the packet forwarding threshold $Th_{For}$, respectively. If the RSSI is less than the proactive caching threshold but greater than the packet forwarding threshold, then the proactive cache mechanism (stage 710) is launched.

At stage 710, two steps are involved in the proactive caching: a proactive caching procedure and selection of caching candidate set. The proactive caching procedure is based on the IAPP protocol, particularly IEEE 802.11f.

At stage 710, the selection of the caching candidate set begins with a mask operation. As noted above, before the proactive caching mechanism of stage 710 is started, the AP initiates the proactive caching mechanism if a signal quality from the serving AP is being continuously degraded. One reason for the degradation is that the mobile is moving away from the AP and the proactive caching is reasonable. As the RSSI value falls in the trigger range (e.g., the first and second handoff threshold values), the mask operation selects APs with good signal quality that the mobile can probe and the serving APs can make sure is within the same operator (e.g., from operators 304 of FIG. 3).

The mask operation derives a handoff candidate set $K_C$ by an "AND" operation between the index list of the AP and the active neighbor set for the mobile. This mask operation can select the best quality APs for providing service continuation in a multi-operator environment.

At stage 712, after the AP obtains the handoff candidates set ($K_C$), it predicts the most likely target AP by a weighting max operation. The weighting max operation obtains caching candidate set $K_c$ by the following steps:

1. Calculating the weighted handoff tendency coefficient for each (oAP,tAP) couple by $wHTC_{i,j}=P_j*W_{i,j}$ (or equivalently, $wHTC_{i,j}=P(oAP,tAP)*W(tAP)$;
2. Assigning the number of APs (i.e., p) to be cached;

3. Calculating $\xi = \underset{tAP \in H_C}{\operatorname{argmax}}\{wHTC_{i,j}\}$;

4. Adding $\xi$ into $K_C$ and removing $\xi$ from $H_C$;
5. Decreasing p by 1; and
6. Calculating $\xi$ of No. 3 above if $H_C$ is non-null and p>0

The weighting max operation may select the AP $\xi$ with maximum value of a product of a corresponding priority value P(oAP, new AP) in the handoff matrix and the information weighting function W(tAP). The set $H_C$ is a temporary set containing all nearby APs in index list 401 and active neighboring set 600. Each time an AP is found, and it is added into the $K_C$, it is removed from the set $H_C$. The number of caching APs p is a system parameter related to the signaling overhead and packet forwarding performance.

After $K_C$ is obtained, the proactive caching procedure may take place with $K_C$ as the neighbor graph. In the proactive caching procedure, the IAPP entity caches the mobile profile (context) to each AP in caching candidate set $K_C$. Note that if p is set to be 1 or no further mobile report is available for adjacent APs, default caching is performed by simply choosing the AP with $$\underset{tAP \in H_C}{\max} \{P(oAP, tAP)\}.$$

This is to ensure the reliability of the proposed caching candidate selection algorithm.

With regard to the initiation of the packet forwarding at stage 714, since the received RSSI is decreasing and below the packet forwarding threshold, $Th_{For}$, the packet forwarding procedure is taken before the handoff procedure. As noted above, performing the packet forwarding procedure in advance will greatly reduce the handoff latency, packet forwarding loss, and buffer overflow probability.

With regard to the mobile controlled handoff, in a WAN-based system, mobile controller handoff is assumed. If the signal quality from the serving AP received by the mobile is below the handoff threshold, $Th_{For}$, the mobile will probe other APs and try to establish a connection with the best AP.

Figure 8:
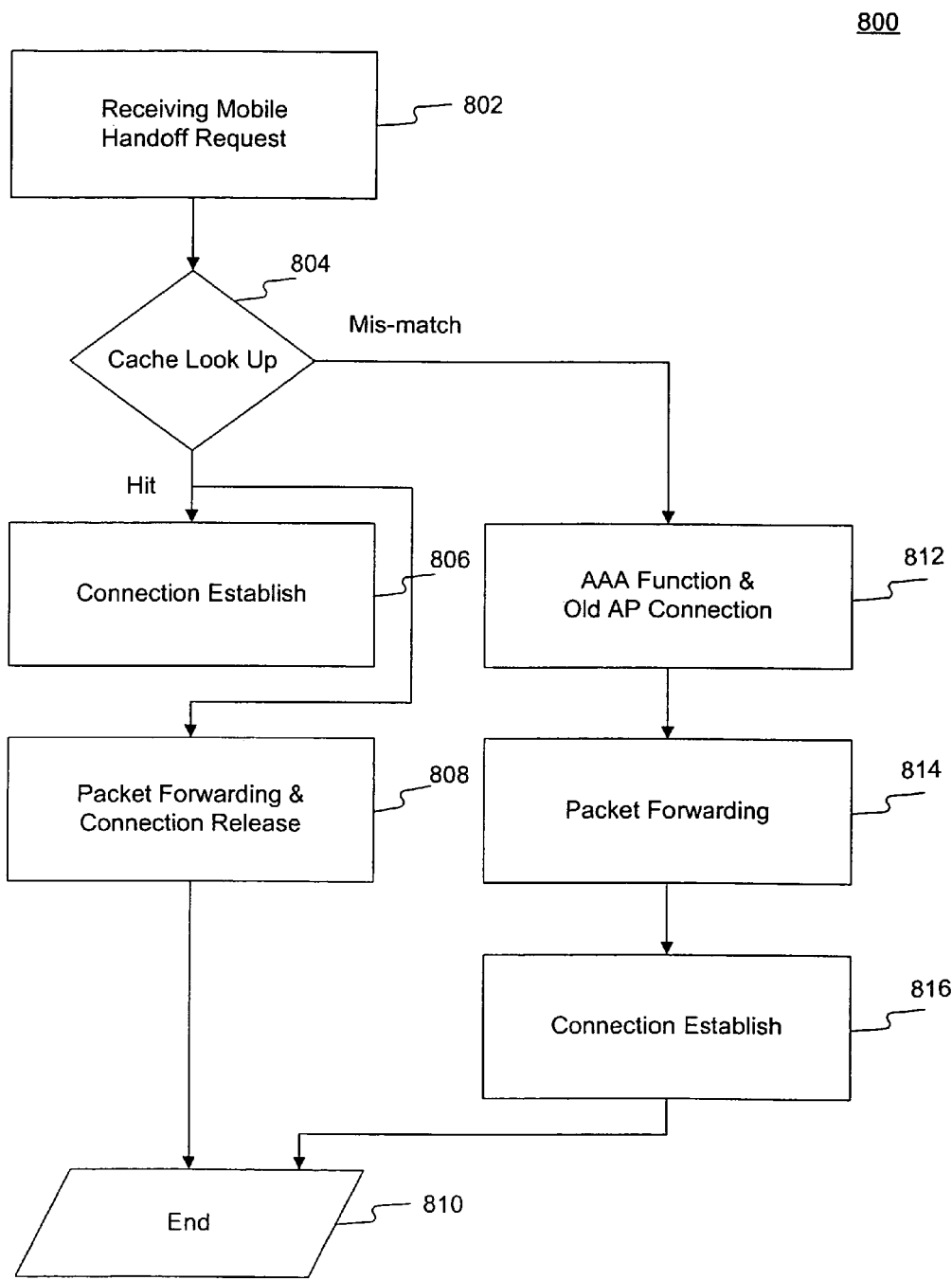
FIG. 8 illustrates a flowchart of a handoff procedure taken in the AP side of which fast handoff capability is equipped.

FIG. 8 illustrates a flowchart of the handoff procedure undertaken in the AP side after receiving a mobile handoff request. A cache look-up action, a procedure with a cache-hit (i.e., a match), and a procedure with a mismatched-cache are included.

At stage 802, an AP receives a handoff request from a mobile. Upon reception of the handoff request from the mobile, the AP looks up a cache table at stage 804. If a cache entry (mobile profile or context) matches, then a radio link with the handoff mobile is directly established at stage 806 without authentication to security server 312. At the same time, the AP sends the IAPP_Move.Notify packet to the old sAP for remaining packet forwarding and connection release at stage 808. Method 800 then proceeds to end stage 810.

If no cache is matched, then the connection is re-established as a new connection in stages 812, 814, and 816. After the connection is established at stage 816, method 800 proceeds to end stage 810.

Figure 9:
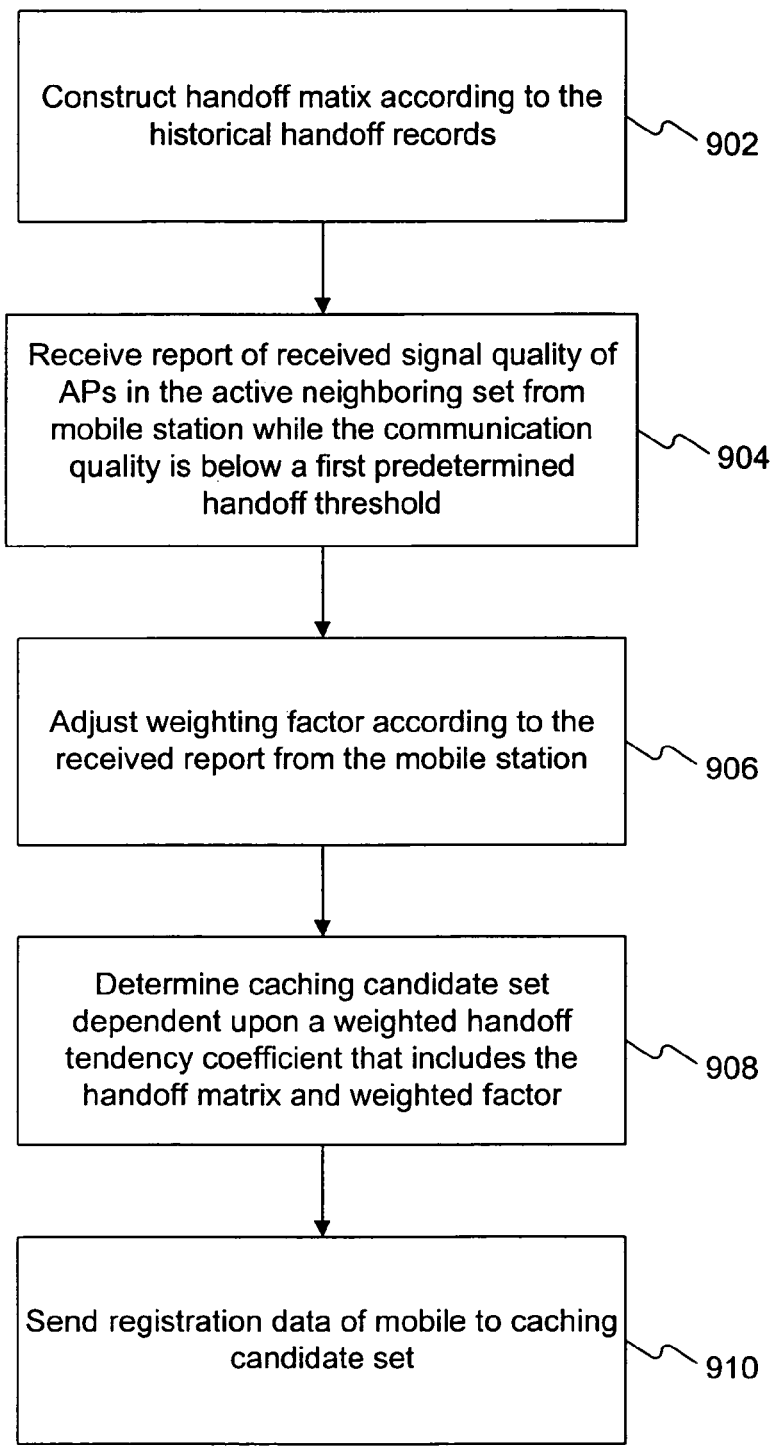
FIG. 9 illustrates a flowchart of a method for providing fast handoff in a heterogeneous environment.

FIG. 9 is a flowchart for a method 900 consistent with the present invention. All actions performed by the home AP are listed in this flow chart which are described above. At stage 902, a home AP constructs a handoff matrix according to historical handoff records stored at the home AP.

At stage 904, the home AP receives a report from a mobile station of received signal quality of all APs within an active neighboring set, while a communications quality associated with the mobile is below a first predetermined threshold. The active neighboring set may include the APs whose pilot beacons are detected by the mobile station. The mobile station reports the information of the active neighboring set to the home AP as noted above.

At stage 906, the home AP adjusts a weighting factor according to the received report. The weighting factors along with the handoff matrix are elements to a weighted handoff tendency coefficient. The weighted handoff tendency coefficient determines a caching candidate set.

At stage 908, if the communications quality of the mobile station is below a second predetermined threshold, the home AP determines the caching candidate set by the weighted handoff tendency coefficient. This occurs when the signal quality of the pilot beacon associated with the home AP is lower than the predetermined threshold and the mobile station informs the home AP for the initiation of proactive caching.

At stage 910, the home AP sends registration data of the mobile station to all APs in the caching candidate set.

Table 1 shows simulation results by comparing the signaling performance for the IAPP and methods, systems, algorithms disclosed herein. The simulation environment is a Manhattan street wherein the APs are constellated at street corners. It can be seen that systems and methods consistent with the present invention can largely reduce the signaling overhead with the assistance of the weighted function ($wHTC_{i,j}$). The latency time of the proposed algorithm is almost the same as that of the IAPP, including when P=1 case. Systems and methods consistent with the present invention can accurately find the most appropriate handoff target with the assistance of the weighted function, so the signaling flooding problems, as well as other problems noted herein, can be alleviated.

TABLE 1

| the simulation results for IAPP and proposed algorithms | | | | |
|---|---|---|---|---|
| | P = 1 | P = 2 | P = 3 | P = 4 |
| Without $wHTC_{i,j}$ (Proposed/IAPP) | | | | |
| Overhead % | 25% | 50% | 75% | 100% |
| Latency (times) | 8.22 | 3.85 | 1.19 | 1 |
| With $wHTC_{i,j}$ (Proposed/IAPP) | | | | |
| Overhead % | 25% | 50% | 75% | 100% |
| Latency (times) | 1.01 | 1.01 | 1 | 1 |

Another embodiment consistent with the present invention utilizes a fast handoff algorithm for DSRC systems. The proposed general framework for a multiple-operator, WLAN-based fast handoff scheme can be completely applied to DSRC systems. In the context of DSRC systems, the AP and mobile in FIG. 3 would be changed to be RSU and OBU. The RSSI values of RSUs can be scanned via the RST packets in the control channel.

A DSRC system (Dedicated short range communication) is an WLAN-like system designed for faster handoff speed in public domain. The physical and MAC layers are compatible to 802.11a. The channel structure is modified to facilitate the scanning process where one global control channel and six (6) service channels are defined. A MAC-extension layer is added above the original MAC layer.

Handoff of an STA only occurs during transaction in a service channel. In this situation, the active STA can continuously measure the RSSI from the serving RSU and feedback the reports on the uplink. However, since the scanning to other RSUs may be taken in the control channel, the report of RSSI values from other members in an active neighbor set is not always available or is frequently updated. This is overcome by predicting the candidates in terms of a long term handoff relationship among RSUs in the handoff matrix.

The bi-threshold proactive caching and packet forwarding initiation schemes are located at the RSU side and fully controlled by the serving RSU. On the other hand, the actual handoff action is taken by the mobile. These features are completely compatible with DSRC systems.

It will be apparent to those skilled in the art that various modifications and variations can be made in the disclosed process without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for providing proactive caching in a communication system, said method comprising:
   constructing a handoff matrix, including a plurality of access points in an active neighboring set;
   receiving reports of signal quality for the active neighboring set;
   adjusting weighting factors for the active neighboring set according to the received reports;
   determining a caching candidate set, having the active neighboring set, according to a weighted handoff tendency coefficient;
   sending registration data of the mobile station to the caching candidate set when the communication signal received at the mobile station is below a predetermined first threshold level; and
   forwarding remaining data of the mobile station to the caching candidate set when the communication signal received at the mobile station is below a predetermined second threshold level;
   wherein the weighted handoff tendency coefficient is based upon the handoff matrix and the weighting factor; and
   wherein the weighted handoff tendency coefficient is: $wHTC_{i,j}=P_j*W_{i,j}$ wherein $P_j$ is an element in the handoff matrix and $W_{i,j}$ is the weighting factor.

2. The method of claim 1, wherein the handoff matrix further comprises an updating algorithm.

3. The method of claim 2, wherein the updating algorithm comprises functionalities of handoff matrix growing, handoff matrix learning, and handoff matrix aging.

4. The method of claim 1, wherein the handoff matrix is a two-dimensional array which stores the active neighboring set and indicates a relationship among the access points within the active neighboring set.

5. The method of claim 4, wherein the handoff matrix uses an index list, wherein the index list includes address information of the plurality of neighboring access points of the home access point.

6. The method of claim 1, wherein the handoff matrix is updated based upon a chronicle of handoff records.

7. The method of claim 1, wherein $P_j$ is used to indicate a relationship between a home access point AP and a j-th access point AP residing in a neighboring area.

8. The method of claim 7, wherein $W_{i,j}$ is derived according to mobile specific information including a signal strength of a pilot beacon sent from the j-th AP and received by an i-th station.

9. The method of claim 8, wherein $W_{i,j}$ is gradually adjusted according to the received indication of signal strength, or other mobile-specific information.

10. The method of claim 1, wherein the first threshold is related to a proactive caching threshold and the second threshold is related to a packet forwarding threshold.

11. The method of claim 1, wherein said method applies to a DSRC system.

12. A method for providing a handoff in a heterogeneous communications system, said method comprising:
    receiving signal strength characteristics associated with a plurality of nearby access points as measured by a mobile station;
    determining a caching candidate set that is a weighted list of the nearby access points based upon the associated signal strengths; and
    sending registration information regarding the mobile station to the access point listed in the caching candidate set;
    wherein the weighted handoff tendency coefficient is: $wHTC_{i,j}=P_j*W_{i,j}$ wherein $P_j$ is an element in the handoff matrix and $W_{i,j}$ is a weighting factor.

13. The method of claim 12, further comprising handing off the mobile station to one of the plurality of nearby access points based upon the caching candidate set.

14. The method of claim 12, wherein receiving occurs when a communication signal received by the mobile station from a home access point is below a first threshold.

15. The method of claim 14, wherein handing off occurs when the signal received by the mobile station from the home access point is below a second threshold.

16. The method of claim 15, wherein the first threshold is related to proactive caching and the second threshold is related to packet forwarding.

17. The method of claim 16, wherein determining the caching candidate set is dependent upon a weighted handoff tendency coefficient.

18. The method of claim 17, wherein the weighted handoff tendency coefficient is based upon a handoff matrix and weighting factor.

19. The method of claim 18, wherein the handoff matrix includes an active neighboring set and uses an index list.

20. The method of claim 12, wherein $P_j$ is used to indicate a relationship between the home access point (oAP) and a j-th access point (tAP) residing in a neighboring area.

21. The method of claim 20, wherein $W_{i,j}$ is used to indicate a signal strength of a pilot beacon sent from the j-th access point and received by an i-th station.

22. The method of claim 21, wherein $W_{i,j}$ is gradually adjusted according to the received indication of signal strength.

23. A system for providing proactive caching comprising:
a home access point that receives measurement reports and constructs a caching candidate set based upon the measurement reports and a handoff matrix; and
a plurality of nearby access points included in the caching candidate set;
wherein the caching candidate set is determined using a weighted handoff tendency coefficient;
wherein the weighted handoff tendency coefficient is: $\text{wHTC}_{i,j} = P_j * W_{i,j}$ wherein $P_j$ is an element in the handoff matrix and $W_{i,j}$ is a weighting factor.

24. The system of claim 23, wherein the weighted handoff tendency coefficient is based upon a handoff matrix and a weighted factor.

25. The system of claim 23, wherein $P_j$ is used to indicate a relationship between the home access point (oAP) and a j-th access point (tAP) residing in a neighboring area.

26. The system of claim 25, wherein $W_{i,j}$ is used to indicate a signal strength of a pilot beacon sent from the j-th access point and received by an i-th station, or other mobile-specific information of j-th station.

27. The system of claim 26, wherein $W_{i,j}$ is gradually adjusted according to the measurement reports, wherein the measurement reports include received indication of signal strength or other mobile specific information.

28. A method for providing proactive caching in a communication system wherein a handoff can be completely controlled by one or more mobile stations, said method comprising:
maintaining an active neighboring set for each mobile station, wherein the active neighboring set is a local network topology detected by each mobile station;
dynamically constructing a handoff matrix, wherein the handoff matrix is a current network topology discovered by an access point;
adjusting a weighting factor for the active neighboring set according to a received report of signal quality for the active neighboring set;
determining a caching candidate set, having the active neighborhood set, according to a weighted handoff tendency coefficient; and
determining a mechanism to initiate proactive caching and forwarding of remaining data for the mobile station, according to a first and a second predetermined received signal strength, wherein the weighted handoff tendency coefficient ($\text{wHTC}_{i,j}$) satisfies: $\text{wHTC}_{i,j} = P_j * W_{i,j}$, wherein $P_j$ is an element in the handoff matrix and $W_{i,j}$ is a weighting factor.

29. The method of claim 28, wherein the element in the handoff matrix $P_j$ is used to indicate a relationship between a home access point and a j-th access point residing in a neighboring area.

30. The method of claim 29, wherein the weighting factor $W_{i,j}$ is derived according to mobile specific information including a signal strength of a pilot beacon sent from the j-th access point and received by an i-th mobile station.

31. The method of claim 30, wherein the weighting factor $W_{i,j}$ is adjusted according one of said signal strength and mobile-specific information.

* * * * *

UNITED STATES PATENT AND TRADEMARK OFFICE
CERTIFICATE OF CORRECTION

| | | |
|---|---|---|
| PATENT NO. | : 7,236,786 B2 | Page 1 of 1 |
| APPLICATION NO. | : 10/872572 | |
| DATED | : June 26, 2007 | |
| INVENTOR(S) | : Jia-Ching Shen et al. | |

It is certified that error appears in the above-identified patent and that said Letters Patent is hereby corrected as shown below:

In claim 31, column 16, line 29, "according one" should read --according to one--.

Signed and Sealed this

Twenty-eighth Day of August, 2007

JON W. DUDAS
*Director of the United States Patent and Trademark Office*